P. K. HUGHES.
Vehicle-Axle Box.
No. 212,382.  Patented Feb. 18, 1879.
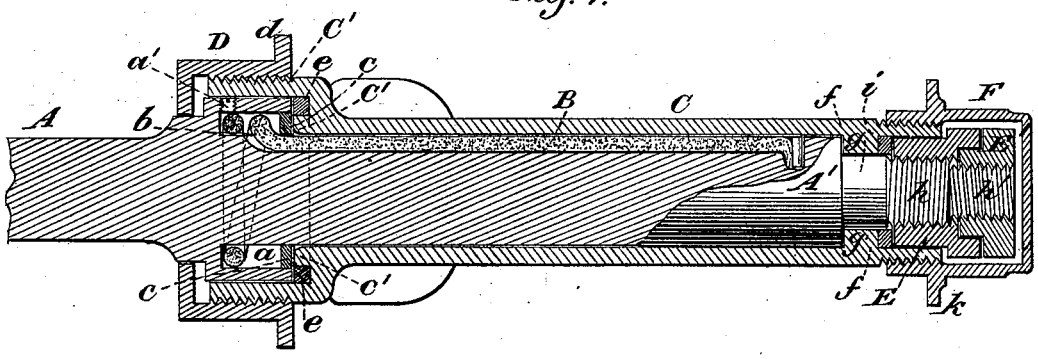
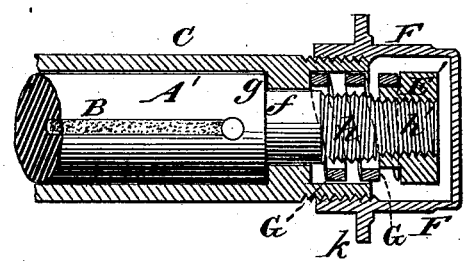
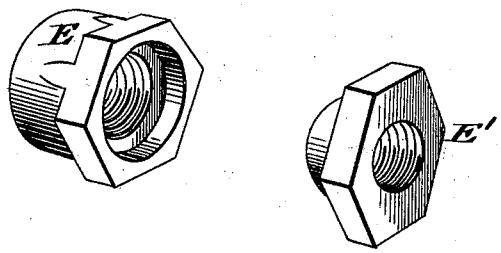
Witnesses.
A. Ruppert,
James H. Lange.
Inventor:
Patrick X. Hughes
per Edson Bros,
Attorneys.

UNITED STATES PATENT OFFICE.

PATRICK K. HUGHES, OF AUBURN, NEW YORK.

IMPROVEMENT IN VEHICLE-AXLE BOXES.

Specification forming part of Letters Patent No. 212,382, dated February 18, 1879; application filed November 18, 1878.

*To all whom it may concern:*

Be it known that I, PATRICK K. HUGHES, of Auburn, in the county of Cayuga and State of New York, have invented certain new and useful Improvements in Carriage-Axle Boxes; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1 is a longitudinal section of my axle-lubricator, with a portion in side view. Fig. 2 is a similar detailed view thereof; and Fig. 3 shows views, in perspective, of two forms of nuts used in connection with lubricator.

Corresponding parts in the several figures are denoted by similar letters of reference.

This invention relates to certain improvements in axle-lubricators, one or the principal object of which is to compensate the wearing of the packing and the thorough feeding of the lubricant or oil; and it consists in providing an oil or lubricant chamber around the inner ends of the spindles of the axle, from which the lubricant is fed along the spindles, preferably by wicking coiled around the spindle in the oil-chambers and disposed along the spindle in grooves. The oil or lubricant chamber is covered or inclosed by an enlargement on the inner end of the sleeve or box, whose exterior circumference is screw-threaded and fitted with a similar cap or nut. The outer end of the sleeve or box is held to its place by means of a nut and spring.

In the accompanying drawings, A is the axle; A', its spindle, which is provided at its inner end with an oil or lubricant chamber, $a$, formed in part preferably by casting the axle at that point with an annular flange, which flange is formed with a deep rim extending parallel with the spindle A', as clearly seen in Fig. 1. The lubricant is supplied to the chamber $a$ through a screw-plugged aperture, $a'$.

B is wicking, with its inner end coiled around the same end of the spindle within the lubricant-chamber $a$, and thence extended along the spindle in a groove, $b$, therein to a point near the outer end of said spindle, where it is pinned into a socket in the spindle or otherwise secured. This wicking will, it is obvious, by reason of its power of conduction, feed the oil or lubricant along the spindle, and thus lubricate the same. The lubricant is prevented from wasting from the chamber $a$ by the packing-ring $c$.

C is the axle sleeve or box, with its inner end provided with an enlargement, C', covering the oil-chamber $a$, and having its exterior circumference cut with a screw-thread, as seen in Fig. 1.

A cap or nut, D, with a flange, $d$, and provided with a screw-thread on its internal circumference, is screwed upon and holds that end of the sleeve or box in place. The sleeve or box C is provided at its extreme inner end with an annular flange or projection, $c'$, which serves to hold the packing $c$ in place in the oil-chamber, as seen in Fig. 1. $e$ is another packing-gland fitting around the annular projection or flange $c'$ of the sleeve or box C, and against the oil-chamber case $a$, as seen in the latter-mentioned figure.

The outer end of the sleeve or box C is provided upon the inside with a shoulder, $f$, the purpose of which is to afford a bearing-surface for the spiral spring G, which encircles the outer part of spindle A'. The outer end of the spring G bears against the shoulder formed on the nut E', as clearly shown in Fig. 2. By means of the spring G, bearing at one end against the shoulder $f$ on the sleeve C, and at the other end against the shouldered nut E', "chucking" is prevented.

The spindle A' is provided beyond the shoulder $g$ with a right-hand screw, $h$, and beyond this screw with a reversed or left-hand screw, $h'$.

E is a countersunk or recessed nut, which screws upon the screw $h$ of the spindle against a packing, $i$, Fig. 1, pressing against the shoulder $f$ of the sleeve or box C, directly securing the said sleeve or box in place upon the spindle. This nut is prevented from working loose or off the spindle by means of the nut E', which is fitted upon the screw $h'$ of the spindle A', and into the countersunk or recessed head of the nut E, with its flange bearing against the head of the nut E, thus locking it in place. An ornamental cap, F, is screwed upon this end of the sleeve or box C, inclosing the nuts just described, and excluding mud, &c., therefrom. This cap is provided with a flange, $k$, fitting in under the flange of the outer end of the wheel-hub.

By this construction it is obvious that the wearing of the packing or parts can be compensated by screwing up of the said parts.

By providing the box C with the internal annular shoulder, $f$, the lubricating substance is kept within the box and on the arm of the axle. Further, I am enabled to make a smaller box having the same degree of strength, by which the bore of the hub which receives the box is made smaller, thus necessarily strengthening the hub.

Having thus described my invention, what I claim, and desire to secure by Letters Patent, is—

1. The combination, with the chambered spindle $A'$ $a$, of the wicking B, coiled around the spindle and held in said chamber by the annular imperforate packing-ring $c$, said wicking passing under the ring $c$, and sunk in a groove extending along the spindle, substantially as and for the purpose set forth.

2. The combination, with the chambered spindle $A'$, having the imperforate packing-ring $c$, of the enlarged sleeve C, provided with the annular packing-ring $e$, sunk in a recess formed in the head of said sleeve, projection $C'$, and cap D, substantially as and for the purpose set forth.

3. The combination, with the spindle $A'$, provided on its outer end with a spiral spring, G, and shouldered nut $E'$, of the sleeve C, having the internal annular shoulder $f$, substantially as and for the purpose set forth.

4. The vehicle-axle consisting of the screw-threaded axle-spindle $A'$, having the oil or lubricant chamber $a$, imperforate packing-ring $c$, groove $b$, and shoulder $g$, screw-threaded enlarged sleeve or box C $C'$, having the internal annular shoulder, $f$, wicking B, packing $e$, cap D, spring G, and shouldered nut $E'$, substantially as and for the purpose set forth.

In testimony that I claim the foregoing as my own I hereunto affix my signature in presence of two witnesses.

PATRICK K. HUGHES.

Witnesses:
BENJ. M. WILCOX,
S. J. WESTFALL.